Oct. 31, 1933.  G. GODDU  1,932,545
MANUFACTURE OF SHOES
Filed Aug. 15, 1929   2 Sheets-Sheet 1

INVENTOR
George Goddu
By his Attorney
Harlow H. Davis

Oct. 31, 1933.　　　　　G. GODDU　　　　　1,932,545
MANUFACTURE OF SHOES
Filed Aug. 15, 1929　　　2 Sheets-Sheet 2

INVENTOR
George Goddu
By his Attorney
Harlow M. Davis

Patented Oct. 31, 1933 1,932,545

UNITED STATES PATENT OFFICE 1,932,545

MANUFACTURE OF SHOES

George Goddu, Winchester, Mass., assignor, by mesne assignments, to The Littleway Process Company, Boston, Mass., a corporation of Massachusetts Application August 15, 1929. Serial No. 386,097

44 Claims. (Cl. 12—142)

This invention relates to the art of shoemaking and, as illustrated herein, to methods for use in the manufacture of shoes in which uppers are secured in overlasted relation to sole members by cement, and to shoes produced by such methods.

In my copending application for Letters Patent of the United States Serial No. 378,155, filed July 13, 1929, I have disclosed and claimed a novel method of making cement-lasted shoes in the practice of which water-dispersed rubber cement is applied to the marginal portions of the upper and insole, the upper worked over the last while the cement is fresh and secured in lasted position while the cement is setting by fastenings inserted in such manner that they do not pass through the inner surface of the insole, the fastenings preferably being removed after the cement has set.

It is an object of this invention to provide an improved method of making shoes which, while possessing the advantages of the method of my above-identified application, will be better adapted to the shoe manufacturing conditions of certain manufacturers who are not in a position so advantageously to make shoes in accordance with the method of said application by reason, for example, of the fact that the machinery which they possess is not of the type required for the carrying out of one or more of the steps of that method. To suit the requirements of such manufacturers I have developed the method of the present application characteristic advantages of which are the ease and rapidity with which the side lasting operation can be performed, the convenience with which the excess of upper material can be trimmed off, and the general excellence of the construction, appearance and durability of the shoes produced.

Other objects of the invention are to provide a method of making cement-lasted shoes by the practice of which wrinkling of the overlasted portion of the upper is avoided, any excess of cement used in lasting is eliminated, a shoe having a forepart with a smooth and even bottom for the reception of an outsole is produced without the use of filling material, and the possibility of penetration of the insole by lasting fastenings at the sides and shanks of the shoes is prevented.

Prior to my invention is has been customary, in the manufacture of shoes in which the overlasted portion of the upper is secured to the bottom of the insole by cement, to employ pyroxylin cement in lasting and to last a cemented upper over the bottom of a cemented insole around the periphery of the shank and forepart of a shoe from breast line to breast line, lasting tacks being inserted through the upper and insole and into the last to take the strain of the upper while the cement is setting, the tacks being partially driven so that after the cement has set they can be readily removed. In order adequately to hold the upper a large number of tacks is required, and even then the upper tends to wrinkle between the tacks and does not lie as flat against the margin of the insole as is desirable. Obviously, when the margin or lasting allowance of the upper is laid against the bottom of the insole, the edge of the upper must occupy a line much shorter than the periphery of the unlasted upper, so that wrinkling of the overlasted margin of the upper at some points thereof is very difficult to avoid. At some portions of the shoe these wrinkles frequently extend to the edge of the last bottom, and when pyroxylin cement is used any wrinkles formed in the overlasted portion of the upper are rendered permanent when the cement has set. When the tacks are withdrawn and the operation of scouring or roughening the overlasted portion of the upper is performed to condition the upper for the reception of the cement by which the outsole is to be attached, these wrinkles not only make the roughening operation more difficult but, if the wrinkles are prominent, they may result in the upper being scoured entirely through where the wrinkles occur, thus impairing the hold of the outsole upon the upper.

When the tacks employed to hold the upper in lasted position are withdrawn, they fly about, getting upon the floor, benches and racks and become a menace to the shoes in process and to the operators. Moreover, the repeated driving of such a large number of tacks in the lasts soon renders them unfit for further service so that the repairing of the lasts or the replacing of them with new ones constitutes a large factor in the expense of manufacturing these shoes.

In the operation of wiping the upper over the last bottom, the excess of pyroxylin cement between the plies of the upper and between the lining and insole is expelled and accumulates on the bottom of the insole at the edge of the overlasted portion of the upper. In drying, this expelled cement forms lumps and irregularities which it is difficult to remove and which, unless thoroughly disposed of, may, when the outsole is applied, cause squeaking of the shoe and result in irregularities which appear through the outsole, thus detracting from the appearance of the shoe. Moreover, the pressure incident to the lasting operation as usually performed tends to expel too much of the cement or to force it into the interstices of the shoe materials so that insufficient cement is left in the joint to secure firm adhesion of the upper to the insole, thus forming what is termed a "starved" joint.

In lasting the sides or shanks of shoes by the use of pyroxylin cement, it is necessary, because the cement dries so quickly, to apply cement to one side of the shoe only, then to last that side, and then to cement the other side and last it, so that repeated handlings of the shoe are required.

When the wings of the counter extend into the shank portion of the shoe and when the rear part of the shoe is provided with a leather lining, as is frequently the case in this class of work, it is difficult adequately to secure the upper, counter and lining in proper relation to the insole by the use of cement alone because the counter usually has a glazed surface upon which the cement cannot obtain a good hold unless the glaze is scoured off, and the leather lining has at least one finished surface which it is necessary to roughen in order to insure that it will be held by cement.

Further objects of this invention are to provide a method of making shoes by the practice of which the disadvantages and objections to prior methods such as those above outlined are obviated and other material advantages are secured.

In the manufacture of shoes by the illustrated method, cement is applied to the marginal portions of the upper materials which are to be lasted over the margin of the insole and to the margin of the insole, the insole and upper being assembled upon a last and the upper pulled over. The upper at the side of the shoe is then worked over the bottom of the insole into lasted position with the inner portion of its margin in upstanding relation to the bottom of the sole and is fastened to the sole, to insure that the upper will be held in lasted position while the cement is setting, by fastenings inserted in such a manner that they do not extend through the sole and after the cement has set the upstanding portion of the upper is trimmed off. It is important that the inner portion of the overlasted margin of the upper be thus worked into upstanding relation to the bottom of the insole and so held in order that it may be more readily trimmed off so as to eliminate from the shoe that portion of the upper in which wrinkles are more prominent and difficult to avoid if the upper is laid flat against the insole. The fastenings employed for holding the upper in lasted position while the cement is setting are preferably staples so driven that their bars engage the upper and hold a portion of its margin clamped against the insole in lasted position and a portion in upstanding relation to the insole, the legs of the staples being anchored in the insole. The fastenings may be allowed to remain as means for holding the upper in addition to the cement or they may be removed in case a shoe having no metallic fastenings in the forepart, or in neither the shank nor the forepart, is desired.

Preferably, in order to facilitate the working of the inner portion of the margin of the overlasted upper into upstanding relation to the insole, the insole is provided with a shoulder in transverse relation to its bottom face at a predetermined distance from its edge. The margin of the upper is worked into lasted position in substantial conformity to the angle between the margin of the sole and the shoulder and fastenings, for example staples, are employed to secure the upper in lasted position in the angle. The upstanding portion of the upper is thereafter trimmed substantially flush with the exposed face of that portion of the upper which overlies the margin of the insole.

The shoulder may be in the form of a lip or rib in upstanding relation to the bottom of the insole, the upper being fastened to the lip in upstanding relation to the insole and the fastenings, in case they are staples, may be driven through the upper and lip and clinched on the inner face of the lip to insure that the upper will be held in lasted position while the cement is setting. When the lip and upper are trimmed substantially flush with that portion of the upper which overlies the margin of the insole, the fastenings are removed.

In conjunction with its shoulder or lip the insole may be provided with a marginal recess, which recess is preferably of substantially the same depth perpendicularly to the plane of the insole as the thickness of the upper materials so that when the upstanding portion of the upper is trimmed off the trimming can be done substantially flush with the central portion of the bottom of the insole. Under such conditions this trimming will also be flush with the exposed face of that portion of the upper which overlies the margin of the insole, thus providing a shoe with a smooth, even bottom for the reception of an outsole laid in contact with the exposed face of the overlasted portion of the upper and with the insole.

By working the upper into upstanding relation to the bottom of the insole, and particularly when the insole is provided with a shoulder or lip, any excess cement between the layers of the upper materials and between the insole and upper materials is caused to flow outwardly of the shoe between these cemented surfaces and to accumulate on and adhere to those portions which later are trimmed off. In this manner any excess cement is disposed of and does not remain on the shoe bottom to interfere with the proper laying of the outsole.

Preferably, in lasting the sides of the shoe from tip line to breast line, successive portions of the margin of the upper are pulled heightwise of the last, carried in over the marginal recess of the insole, pushed down into the angle between the lip and the recess with the edge portion of the upper in upstanding relation to the bottom of the insole, and, at the conclusion of each step of the lasting operation, each lasted portion of the upper is secured to the lip of the insole by a staple inserted through the upper and lip in a plane slightly above the outer face of the insole. This method of lasting avoids wiping the upper from the edge of the insole inwardly, as is the usual practice, with the result that enough cement remains in the joint to secure good adhesion of the cemented surfaces instead of too much cement being forced out and producing a "starved" joint, as is frequently the case when the upper is wiped from the edge of the insole inwardly. In the operation of working the margin of the upper over the margin of the insole, the lip serves to deflect the inner portion of the margin of the upper upwardly, enables the outer portion of the margin of the upper to be laid smoothly over the recessed margin of the insole, causes the wrinkles to be confined to the upwardly deflected portion of the margin of the upper, and locates the upstanding portion of the margin at a uniform distance from the last edge.

While the toe portion of the shoe may be lasted by the method described, it is preferable to employ for this purpose end-embracing wipers by which the entire toe portion of the upper may be wiped heightwise of the shoe against the sides and end of the toe and over the insole at one time. Preferably, after the upper materials have been wiped over at the toe, the wipers are withdrawn and the toe box and lining materials trimmed away to a line adjacent to the lip of the insole. Cement is then applied to the marginal portions of the insole and the upper, and the upper wiped into finally lasted position. To hold the upper in this position, tacks or a toe binder of usual construction may be employed. However, it is preferable to employ a binder of the type disclosed in Letters Patent of the United States No. 1,894,678, granted January 17, 1933, on an application filed in the name of Joseph Fausse, as hereinafter more fully explained. This binder can be placed under the wipers of the bed lasting machine and pressed down upon the overlasted portion of the upper by the wipers, the binder forcing the upper into the angle between the lip and the margin of the insole. The binder is secured in that relation by a few tacks which hold it in place after the wipers are removed and until the cement has set. The overlasted portion of the upper is thus formed without wrinkles over the margin of the insole and its inner portion is disposed in upstanding relation to the bottom of the insole to facilitate trimming. After sufficient time has elapsed for the cement to set, the binder is removed and the lip and upstanding portion of the upper secured thereto at the forepart of the shoe including any excess of cement clinging to the shoe, are trimmed off, the trimming knife operating substantially in the plane of the outer face of the central portion of the insole and hence removing also the side lasting staples. At the shank portion of the shoe, while the trimming operation may be performed as at the forepart thereby removing the staples, it is preferably done, if at all, in a plane outside of the staples so that at the shank portion the staples remain permanently in the shoe as additional securing means for the upper, lining and counter. These staples, being driven in such a manner that they do not penetrate the insole, cannot come in contact with the foot and, being confined to the shank portion only, do not affect the flexibility of the shoe. After the trimming operation the bottom of the shoe presents at the forepart a perfectly even surface, constituted by the upper and insole, for the reception of the outsole, and the lips thereof left at the shank portion provide between them a groove or pocket for the reception of a steel shank stiffener.

In order to enable the cement to obtain a good hold on the overlasted portion of the upper, the surface of the upper has to be scoured or roughened unless made of fabric or suede leather. The outsole may be attached by cement of a character to afford alone permanent attachment of the upper to the outsole during wear, such as pyroxylin cement, or it may be attached with this or other suitable cement, the last removed and through-and-through stitching inserted to secure the outsole to the insole and the upper. If the outsole is attached by stitching, the staples at the shank serve another important purpose since they prevent any possibility of the upper at the shank portion being loosened by the operation of withdrawing the last.

Preferably, as disclosed in my prior application above referred to and with the attendant advantages therein set forth, water-dispersed rubber cement, such for example as latex, is applied to the surfaces of the upper and insole which are to be secured together, and the lasting operation is performed while the cement is still fresh.

The illustrated shoe produced by the method described comprises an insole the marginal portion of which is reduced in thickness an amount substantially equal to the thickness of the upper materials, an upper overlying the reduced portion of the insole and secured thereto by cement, and an outsole having its margin attached to the outer surface of the margin of the upper overlying the reduced portion of the insole. Preferably a layer of thin fabric is provided between the exposed surface of the insole and the outsole, not as a filler but to prevent the shoe from squeaking. At the shank portion of the shoe the lining and counter have their margins secured in a marginal recess in the insole and the inner portions of their margins upturned and secured by metallic fastenings such as staples to a single inside lip on the insole, the lips at the two sides of the shank being spaced apart sufficiently to receive between them a shank stiffener. If desired cement, for example water-dispersed rubber cement, may be employed in addition to the staples to secure the upper in lasted position, but it is unnecessary unless the staples are to be removed by the trimming operation. Also, if desired, the shank portion of the insole may be plane or unchanneled and the upper may be secured in lasted position by curved staples with or without cement, as disclosed in my prior application referred to above.

The illustrated insole, which is not claimed per se herein, since it forms the subject-matter of my copending application Serial No. 581,922, filed Dec. 18, 1931, as a division of the present application, is provided with a marginal recess the depth of which is substantially equal to the thickness of the upper materials and the width of which is sufficient to provide a surface to which the overlasted upper may be secured by cement. At the inner edge of the recess the insole is provided with a double or two ply shoulder or lip extending along the sides of the forepart and with a single inwardly extending lip along the shank portion. As illustrated, the double lip at the forepart extends above the surface of the central portion of the insole and is in two sections which are unconnected at the toe end and to which the upper is held by staples while the cement used in the lasting operation is setting. The inwardly extending single lip at the shank portion serves for permanent attachment of the upper at that portion of the, for example, shoe by staples driven through the upper and lip and clinched on the inner face of the lip. The upper and lip are thus capable of being laid down against the shank portion of the sole or over the shank stiffener without substantial trimming of the upper materials at this portion of the shoe.

Figures 1, 2, 3:
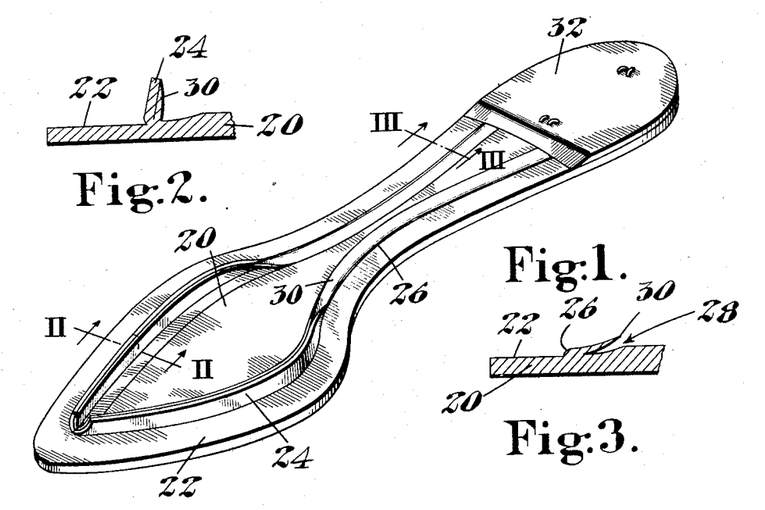
Fig. 1 is a perspective view of an insole utilized in the practice of the method.
Figs. 2 and 3 are sections of the insole upon the lines II—II and III—III, respectively, of Fig. 1.

In the illustrated method of making a shoe in which a cemented upper is lasted over the cemented margin of an insole and secured at some portions at least of the shoe by metallic fastenings to a shoulder or lip on the insole, the shoulder or lip with the attached upper and fastenings being trimmed off flush with the bottom of the insole, the insole may first be prepared as illustrated in Figs. 1, 2 and 3. An insole 20, preferably of leather, is slit inwardly from its edge face to form a marginal surface 22 extending for a distance equal to the amount it is desired to have the upper overlap the margin of the insole, which may be approximately one half inch at the forepart and the same or somewhat less at the shank. This cut is made substantially parallel to the outer face of the insole and spaced therefrom a distance substantially equal to the thickness of the upper materials which are to be used. About half of the width of the outside flap or lip formed by this cut is trimmed off and the remainder turned up into a position substantially perpendicular to the plane of the insole to form a shoulder or lip 24. Thus a marginal recess is formed on the insole over which the upper materials are to be lasted and to which in the completed shoe they are to be held, at least in the forepart, by cement alone, the outer face of the overlasted margin of the upper materials being substantially in the plane of the central portion of the bottom of the insole. It will be noted that the lip 24 of the insole is continuous along the sides of the forepart and is discontinued at the toe end, a gap 25 being there provided which facilitates turning up the lip 24 at the toe end into an upright position. Since the upper is not to be secured at the toe by a continuous seam holding it to the lip, there is no necessity of having the lip continuous. From the ball line rearwardly the lip 24 is omitted, the margin of the insole being reduced, however, to form a shoulder 26 (Fig. 3). By an inside channel 28 a lip 30 is formed which extends from the breast line along the shank and forepart at each side of the insole, the lip 30 at the forepart being cemented to the lip 24, thus forming at the forepart a substantial double or two ply rib or lip which is in upstanding relation to the bottom of the insole and presents an outer face or shoulder which is perpendicular to the marginal surface 22. The lip 24 is backed up and braced by the lip 30 so that a stiff double lip is provided which affords firm anchorage for the upper staples and is not liable to be outwardly displaced by the strain of the lasted upper. A reinforcing piece 32 of leatherboard or similar material having a skived front edge is attached to the heel-seat portion of the insole.

While the insole described is well adapted for use in the practice of my novel method, it is to be understood, of course, that various types of insoles provided with upstanding portions to which the uppers may be secured may be utilized without departing from the method as expressed in the claims.

Figure 4:
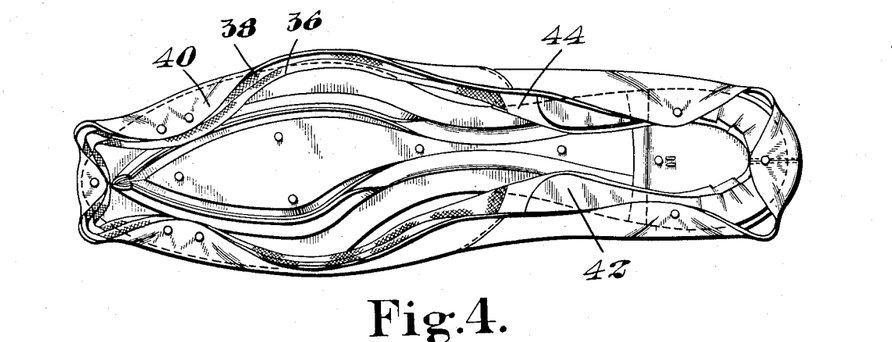
Fig. 4 is a view of the shoe bottom after the insole and upper have been asembled upon a last and the upper pulled over.

An insole 20 thus prepared is attached in the usual manner to the bottom of a last 34, an upper assembled on the last and the shoe pulled over, as illustrated in Fig. 4. The upper materials may comprise a lining 36, a doubler 38 and an outer ply 40 usually of leather. At the rear part of the shoe there is a counter 42, and a rear portion 44 of the lining which may be of leather.

At a convenient time prior to the lasting operation, the margin 22 at both sides of the insole and the corresponding opposed surfaces of the marginal portions of the upper materials are coated with water-dispersed rubber cement, or if desired, pyroxylin cement may be applied to one side at a time of the upper and insole immediately preceding the lasting operation on that side. In the use of pyroxylin cement, it is important to avoid getting cement on the margin of the upper materials beyond the line where they will engage an edge of the insole since in that case the lining will stick to the last and hard spots will be formed in the upper materials. When water-dispersed rubber cement is used, such care does not need to be exercised since the cement is flexible and does not cause objectionable sticking of the upper to the last.

Figure 5:
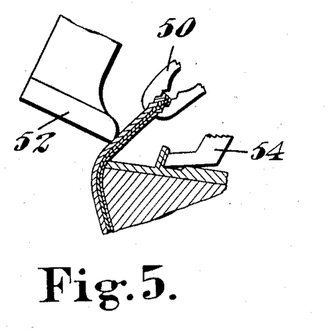
Figs. 5 and 6 are sectional views of the shoe illustrating the side lasting operation, the lasting instrumentalities being shown in elevation.
Figure 6:
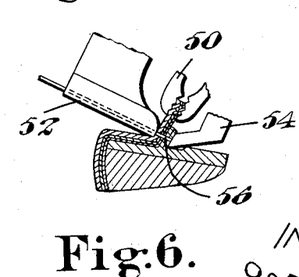
Figures 7, 7A, 8, 9, 9A, 10, 11, 12, 13:
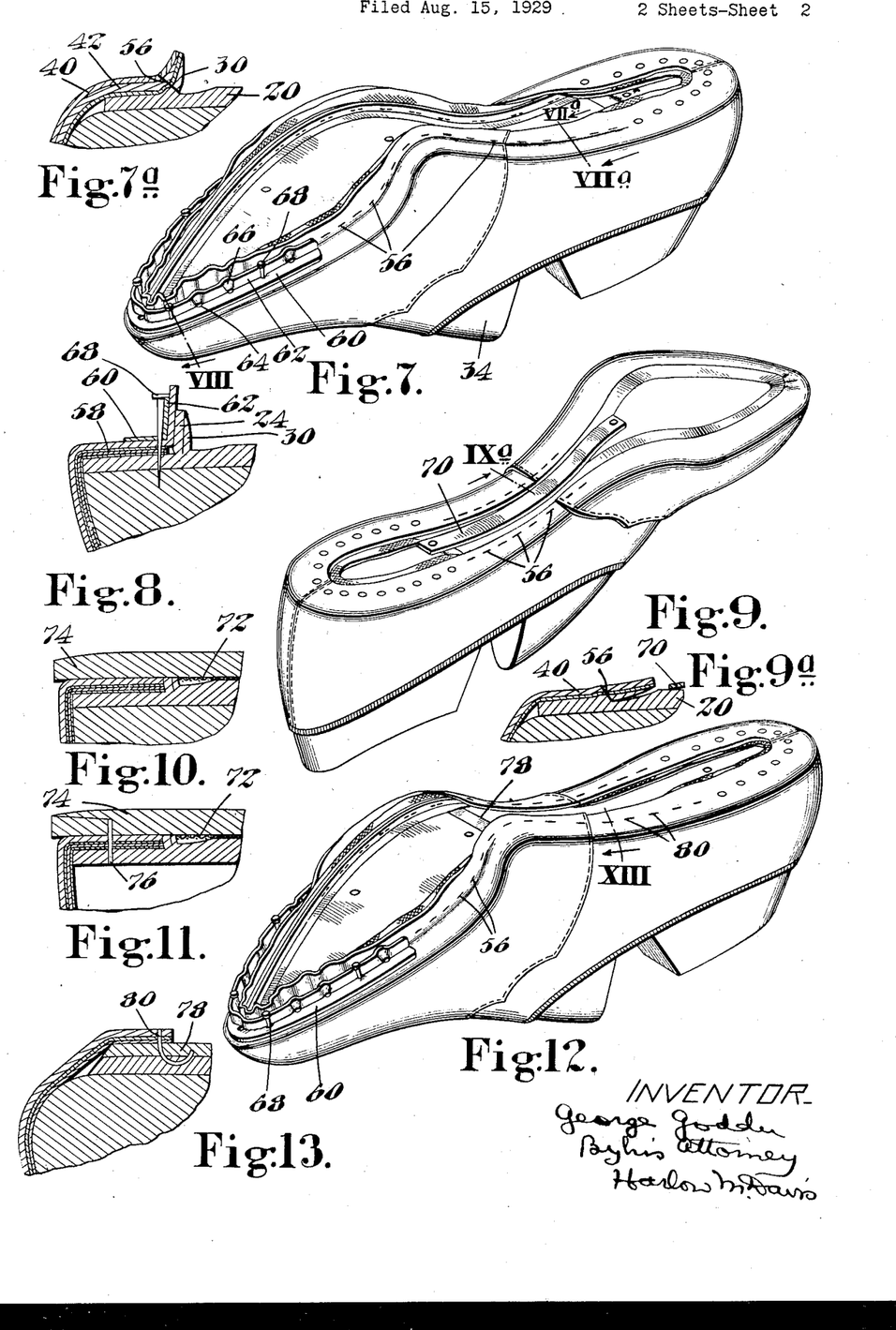
Fig. 7 is a perspective view of the shoe after the lasting operations, including the heel and toe, have been completed.
Fig. 7a is an enlarged sectional detail on the line VIIa—VIIa of Fig. 7.
Fig. 8 is an enlarged sectional detail on the line VIII—VIII of Fig. 7.
Fig. 9 is a perspective view of the shoe showing the shoe bottom prepared for the reception of the outsole.
Fig. 9a is an enlarged sectional detail on the line IXa of Fig. 9.
Fig. 10 is an enlarged sectional detail of the forepart of the shoe after the outsole is applied.
Fig. 11 is a view similar to Fig. 10 showing the outsole attached by through-and-through stitching.
Fig. 12 is a perspective view showing a modification of the shoe at the shank portion.
Fig. 13 is an enlarged sectional detail of the shank portion of the shoe shown in Fig. 12.

In the operation of lasting the sides of the shank and forepart, the upper is seized by a gripper 50, tensioned upwardly and drawn over the insole as shown in Fig. 5. A staple nozzle 52 then engages the tensioned portion of the upper materials and forces it, while under tension, into the angle between the margin 22 of the insole and the lip 24, the lip being backed up by a channel guide and clinching tool 54 (Fig. 6). A staple 56 is then driven through the plies of the upper and the double lip 24, 30 at the forepart, the staple being located just outside the plane of the outer face of the central portion of the insole. At the shank portion of the shoe the upper materials will be worked over the marginal portion 22 of the insole against the shoulder 26 and lip 30 and will be stapled to the lip as shown in Fig. 7a. The inner portion of the overlasted margin of the upper is thus secured in upstanding relation to the portion laid against the margin 22 of the insole.

It will be noted that in lasting the forepart as described the upper is carried over the margin of the insole without contact initially with the bottom face of the latter near the edge of the insole and is brought into contact with this face by the stapling nozzle, which moves in an inclined path toward a point located inwardly of the edge of the insole, and that therefore there is less tendency to force the cement out of the joint than there is when the side lasting operation is performed with a machine which wipes the upper against the margin of the insole from its edge inwardly.

This lasting operation at the sides of the shank and forepart may conveniently be performed by the use of a machine of the type disclosed in Letters Patent of the United States No. 1,796,451, granted March 17, 1931.

Although the lasting operation described may be continued about the toe portion of the shoe and some manufacturers may prefer so to last the toe, it is usually preferable to employ end embracing wipers in this operation such as are provided by the well-known bed lasting machine. Prior to this operation a box toe 58 is inserted between the upper materials at the toe. As illustrated in Fig. 7, end embracing wipers have been employed to upwipe and overwipe the toe portion of the upper, including the box toe, and to force upwardly turned marginal portions of the upper materials into contact with the insole lip 24. After satisfactory shaping of the toe portion of the upper materials has been obtained, the wipers are backed off, the surplus material trimmed from the lining, doubler and box toe, cement applied between the plies of the upper materials and the margin 22 of the insole and the upper again wiped in and secured temporarily against the margin 22 of the insole and against the shoulder 24 while the cement is setting. This condition at the toe is illustrated in Fig. 8. While the upper may be thus held in various ways, for instance by the application of a binding wire or by the insertion of tacks through the upper and insole and into the last, I prefer to employ for this purpose a toe binder and method of use thereof as disclosed in the Letters Patent of Joseph Fausse hereinbefore mentioned. This binder, as shown in Figs. 7 and 8, consists of a horseshoe-shaped piece of material, preferably steel, formed to provide two portions at an acute angle to each other, one portion 60 being adapted to engage the overlasted portion of the upper over the margin 22 of the insole and the other portion 62 being adapted to press the upstanding portion of the upper into the angle formed by the margin 22 and the shoulder 24. In the angle between the two portions 60 and 62 of the binder tack holes 64 are provided and the portion 62 adjacent to the tack holes is crimped to provide frusto-conical grooves 66 which serve to guide the points of the tacks into the tack holes 64. In applying this binder to the toe the wipers of the bed machine are backed off and the binder is placed in position with its flange 60 beneath the wipers and the wipers are again closed and pressed down to force the binder against the overlasted upper and the lip 24. Tacks 68 are then inserted into several of the holes 64 with their heads in engagement with the top of the portion 62 so that they hold the binder tightly against the overlasted portion of the upper. Only a few tacks are necessary in order to hold the binder in proper relation until the cement has set. In order, however, that the location of these tacks may be varied as may be desirable, a large number of tack holes 64 is preferably provided. The heel-seat portion of the shoe may be lasted in any usual manner, as illustrated in Fig. 7. The shoe, having now reached the stage illustrated in Fig. 7, is allowed to remain in this condition for a sufficient time to insure that the cement has set sufficiently and that the upper has become fatigued and taken the shape of the last. The toe binder is then released, which may readily be done by engaging the heads of the tacks with a tack puller, using the portion 62 of the binder as a fulcrum.

The trimming operation may now be performed. This consists in removing the upstanding portions of the lip and upper materials with all the cement which may have been exuded from between the cemented surfaces, the trimming cut about the forepart from ball line to ball line being made substantially in the plane of the exposed face of that portion of the upper which overlies the margin of the insole and preferably also in the plane of the bottom of the central portion of the insole and inside the line of staples 56 employed to secure the forepart of the upper. An even and level forepart for the reception of the outsole is thus produced, as illustrated in Fig. 9. While the shank portion of the shoe may be trimmed in the manner explained for the forepart, it is preferable for various reasons to trim the upstanding portions of the upper materials and lip outside the line of staples 56, so that the staples at the shank portion are left in the shoe to afford a more secure attachment of the upper to the insole at this portion of the shoe and to provide between them a space in which a shank stiffener 70 may be located. In fact, no substantial trimming of the upper or lip at the shank portion is necessary since the lip may be laid back into the channel from which it was cut, and the upper may be disposed under or over the shank piece 70.

The surface of the margins of the upper overlying the margin of the insole about the periphery of the shoe from breast line to breast line is preferably scoured or roughened in order to enable the outsole attaching cement to obtain a better hold upon it. To the central portion of the forepart of the shoe bottom thus prepared a thin piece of fabric 72 may be applied to prevent squeaking of the shoe. An outsole 74 is now applied to the shoe, suitable cement being provided between the outsole and the overlasted margin of the upper, and the shoe and sole are pressed together and so held for a sufficient time for the cement to set, this operation being illustrated in Fig. 10. The cement may be either of such a nature as to afford alone permanent attachment of the outsole to the upper, such as pyroxylin cement, or the outsole may be attached preliminarily by such cement or by cement such as the usual rubber cement used in sole laying. The last may then be removed and the outsole secured by through-and-through stitching 76 which extends through the outsole or from a channel therein, through the upper and the margin of the insole, as illustrated in Fig. 11, the stitches being either chainstitches or lockstitches. The shoe will be provided with the usual wood or other heel and the shoe otherwise completed in the usual manner.

As illustrated in Fig. 12, the channeling of the insole rearwardly of the ball line may be entirely omitted and a reinforcing piece 78, which extends to the ball line provided, in place of the piece 32. The shank portion of the shoe thus prepared may be lasted by a machine of the type disclosed in Letters Patent of the United States No. 1,815,297 granted July 21, 1931, on my earlier application, by which the upper is tensioned and staples 80 are driven through the lasted upper and into the insole, the legs of the staples being curved in the body of the insole without penetrating its inner surface as illustrated in Fig. 13. The shoe otherwise will be made in the manner above described.

Having thus described my invention, what I claim as new and desire to secure by Letters Patent of the United States is:

1. That improvement in methods of making shoes in which cement is employed to secure uppers in lasted relation to soles, which consists in assembling a sole provided with a lip and an upper on a last, working the upper over the sole into lasted position against the lip, inserting staples through the upper and lip to insure that the upper will be held in lasted position while the cement is setting, and then removing the staples.

2. That improvement in methods of making shoes in which cement is employed to secure uppers in lasted relation to soles, which consists in assembling a sole provided with a lip and an upper upon a last, working the upper into lasted position over the margin and against the lip of the sole, inserting staples through the upper and the lip with the cross-bars of the staples in clamping relation to the upper and their legs clinched on the lip to insure that the upper will be held in lasted position while the cement is setting, and removing the portion of the margin of the upper which lies against the lip and which contains the staples.

3. That improvement in methods of making shoes which consists in assembling on a last an upper and an insole provided with a lip on its bottom face, applying cement for securing the upper in lasted relation to the margin of the insole, working the upper in lasted position over the margin of the insole and against the lip, inserting temporary metallic fastenings through the upper and lip to insure that the upper will be held in lasted position while the cement is setting, and thereafter removing said fastenings preparatory to the attaching of an outsole to the portion of upper which overlies the insole.

4. That improvement in methods of making shoes in which cement is employed to secure uppers in lasted relation to soles, which consists in working an upper over a sole into lasted position with the inner portion of the margin of the upper in upstanding relation to the sole, holding the upstanding portion of the upper in such a manner as to maintain the upper in lasted position against the bottom of the insole while the cement is setting, and thereafter trimming off the upstanding portion of the upper by which the upper was originally held in lasted position.

5. That improvement in methods of making shoes which consists in applying cement for securing an upper in lasted relation to an insole, working the upper over the margin of the insole into lasted position, fastening a portion of the margin of the upper in upstanding relation to the insole, thereby holding the upper in lasted position against the bottom of the insole while the cement is setting, and thereafter trimming off the upstanding portion of the margin of the upper which originally held the upper in lasted position.

6. That improvement in methods of making shoes which consists in applying cement for securing an upper in lasted relation to an insole, working the upper over the margin of the insole into lasted position, fastening a portion of the margin of the upper in upstanding relation to the insole by staples with their bars in engagement with the upper and with their legs in holding relation to the insole so that the upper will be held in lasted position while the cement is setting, and thereafter trimming off the upstanding portion of the margin of the upper and removing the staples with the portion trimmed from the upper.

7. That improvement in methods of making shoes which consists in applying cement to the margin of an upper and the margin of an insole provided with a lip, working the margin of the upper over the margin of the insole into lasted position, inserting staples through the upper and lip and clinching them against the lip to hold the upper in lasted position while the cement is setting, and thereafter trimming off the margin of the upper and the lip between the staples and the shoe.

8. That improvement in methods of making shoes which consists in applying cement for securing an upper in lasted relation to an insole, working the upper over the insole into lasted position with the inner portion of the margin of the upper in upstanding relation to the insole, fastening the upper in lasted position while the cement is setting by fastenings so inserted that they do not extend entirely through the insole, and thereafter trimming off the upstanding portion of the margin of the upper and removing it and also the staples which are driven through it.

9. That improvement in methods of making shoes which consists in assembling a sole provided with a lip and an upper upon a last, applying cement for securing the upper in lasted relation to the sole, working the upper into lasted relation to the sole and fastening it to the lip to insure that it will be held in lasted position while the cement is setting, and thereafter removing the lip and that portion of the upper which is fastened to the lip.

10. That improvement in methods of making shoes which consists in applying cement for securing an upper in lasted relation to an insole, working the upper over the insole into lasted position with the inner portion of the margin of the upper in upstanding relation to the insole, securing the upper in lasted position while the cement is setting by staples so inserted that their bars engage the upper and their legs extend through a portion only of the insole, trimming off the upstanding portion of the margin of the upper and the staples, and attaching an outsole to the insole and upper.

11. That improvement in methods of making shoes in which cement is employed to secure uppers in lasted relation to insoles, which consists in assembling an insole provided with a lip and an upper upon a last, working the upper over the margin of the insole into lasted position against the lip and fastening the upper in that position to insure that the upper will be held in lasted relation to the margin of the insole while the cement is setting, and thereafter removing the lip and trimming the upper substantially flush with the exposed face of that portion of the upper which overlies the margin of the insole.

12. That improvement in methods of making shoes in which cement is employed to secure uppers in lasted relation to insoles, which consists in assembling an insole provided with a lip and an upper upon a last, working the upper over the margin of the insole into lasted position against the lip, stapling the upper to the lip to insure that the upper will be held in lasted position while the cement is setting, and thereafter trimming off that portion of the upper and the lip in which the staples are located and attaching an outsole in contact with the exposed face of that portion of the upper which overlies the margin of the insole.

13. That improvement in methods of making shoes in which cement is employed to secure uppers in lasted relation to soles, which consists in assembling a sole provided with a lip and an upper upon a last, working the upper over the margin of the sole into lasted position against the lip, inserting fastenings through the upper and lip to insure that the upper will be held in lasted position while the cement is setting, and thereafter trimming off the portions of the upper and the lip in which the fastenings are located, thereby removing said fastenings.

14. That improvement in methods of making shoes in which cement is employed to secure uppers in lasted relation to soles, which consists in assembling on a last an upper and a sole having a lip in upstanding relation to its bottom face, working the upper into lasted position in substantial conformity to the angle between the margin of the sole and the lip, holding the upper in said angle while the cement is setting, and thereafter removing the lip and that portion of the upper which is lasted against the lip.

15. That improvement in methods of making shoes in which cement is employed to secure uppers in lasted relation to insoles, which consists in assembling on a last an upper and an insole having a lip in upstanding relation to its bottom face, working the upper into lasted position in substantial conformity to the angle between the margin of the insole and the lip, holding the upper in said angle while the cement is setting, and thereafter trimming the lip and that portion of the upper which is lasted against the lip substantially flush with the portion of the upper that overlies the margin of the insole and securing an outsole in contact with the exposed face of said last-mentioned portion of the upper.

16. That improvement in methods of making shoes in which cement is employed to secure uppers in lasted relation to insoles, which consists in assembling on a last an upper and an insole having a lip projecting from its bottom face, working the upper into lasted position in substantial conformity to the angle between the margin of the insole and the lip and inserting fastenings through the upper and lip substantially at the base of the lip to insure that the upper will be held in lasted position while the cement is setting, and thereafter trimming off the lip and the portion of the upper which is lasted against the lip substantially flush with the exposed face of that portion of the upper that overlies the margin of the insole, thereby removing said fastenings.

17. That improvement in methods of making shoes which consists in assembling on a last an upper and an insole having a lip projecting from its bottom face, applying cement to the margins of the upper materials and insole, working the upper into lasted position in substantial conformity to the angle between the margin of the insole and the lip, inserting staples through the upper and the lip and clinching the staples on the lip to insure that the upper will be held in lasted position while the cement is setting, and after the cement has set trimming the margin of the upper and the lip substantially flush with the exposed face of that portion of the upper that overlies the margin of the insole, thereby removing the staples.

18. That improvement in methods of making shoes in which cement is employed to secure uppers in lasted relation to insoles, which consists in assembling on a last an upper and an insole having a lip in upstanding relation to its bottom face, working the upper into lasted position in substantial conformity to the angle between the margin of the insole and the lip, inserting staples through the upper and the lip and clinching the staples on the lip to insure that the upper will be held in lasted position while the cement is setting, and thereafter trimming the upper and the lip inside of the line of staples and applying an outsole in contact with the exposed face of that portion of the upper which overlies the margin of the insole.

19. That improvement in methods of making shoes which consists in assembling an insole having a lip and an upper upon a last, applying cement for securing the upper in lasted relation to the insole, working the upper over the margin of the insole into lasted position against the lip, inserting fastenings through the upper and lip, and thereafter trimming the lip and the portion of the upper which is lasted against the lip in such a manner as to remove said fastenings from at least a portion of the shoe bottom and applying an outsole in contact with the exposed face of that portion of the upper that overlies the margin of the insole.

20. That improvement in methods of making shoes which consists in assembling an insole having a lip and an upper upon a last, applying cement to the margins of the upper materials and insole for securing the upper in lasted relation to the insole, working the upper over the margin of the insole into lasted position against the lip at the forepart and shank of the shoe and inserting fastenings through the upper to fasten the upper to the lip, trimming off the lip and the portion of the upper that is lasted against the lip substantially flush with the exposed face of that portion of the upper that overlies the margin of the insole at the forepart of the shoe, thereby removing the fastenings, and trimming the corresponding portions of the lip and upper in the shank in such a manner as to leave the fastenings in the shoe.

21. That improvement in methods of making shoes which consists in assembling an insole having a lip and an upper upon a last, applying cement to the margins of the upper materials and insole for securing the upper in lasted relation to the insole, working the upper over the margin of the insole into lasted position against the lip at the forepart and shank of the shoe and inserting fastenings through the upper to fasten the upper to the lip, trimming off the lip and the portion of the upper that is lasted against the lip substantially flush with the exposed face of that portion of the upper that overlies the margin of the insole at the forepart of the shoe, thereby removing the fastenings, and leaving the fastenings at the shank portion of the shoe to hold the upper permanently in lasted position.

22. That improvement in methods of making shoes in which cement is employed to secure uppers in lasted relation to insoles, which consists in assembling on a last an upper and an insole provided on its bottom face with a marginal recess of substantially the same depth perpendicularly to the plane of the insole as the thickness of the upper materials and with a lip at the inner edge of said recess, working the upper into lasted position in said recess and fastening a portion of its margin in upturned position against the lip to insure that the upper will be held in lasted position while the cement is setting, and thereafter trimming off the lip and the upturned portion of the upper substantially flush with the exposed face of that portion of the upper that overlies the margin of the insole and with that portion of the bottom face of the insole which is located farther inwardly than the lip.

23. That improvement in methods of making shoes in which cement is employed to secure uppers in lasted relation to soles which consists in assembling on a last an upper and a sole provided on its bottom face with a marginal recess and with a shoulder at the inner edge of said recess, working the upper into lasted position in said recess, and fastening a portion of its margin in upturned position against the shoulder to insure that the upper will be held in lasted position while the cement is setting, and thereafter trimming off the upturned portion of the upper substantially flush with the exposed face of that portion of the upper that overlies the margin of the sole.

24. That improvement in methods of making shoes in which cement is employed to secure uppers in lasted relation to insoles, which consists in assembling on a last an upper and an insole provided on its bottom face with a marginal recess of substantially the same depth perpendicularly to the plane of the insole as the thickness of the upper materials and with a lip at the inner edge of said recess, working the upper into lasted position in said recess with a portion of its margin in upturned position against the lip and inserting a plurality of metallic fastenings through the upturned portion of the upper and the lip to insure that the upper will be held in lasted position while the cement is setting, and thereafter trimming off the lip and the upturned portion of the upper substantially flush with the exposed face of that portion of the upper which overlies the margin of the insole and with that portion of the bottom face of the insole which is located farther inwardly than the lip and securing an outsole in contact with said exposed face of the upper and with the insole.

25. That improvement in methods of making shoes in which cement is employed to secure uppers in lasted relation to insoles, which consists in assembling on a last an upper and an insole provided with an upper-attaching portion on its bottom face, working the upper into lasted position over the margin of the insole and fastening it to said upper-attaching portion to insure that it will be held in lasted position while the cement is setting, and thereafter removing the upper-attaching portion of the insole and that portion of the upper that is fastened thereto preparatory to applying an outsole over the upper and the insole.

26. That improvement in methods of making shoes in which cement is employed to secure uppers in lasted relation to insoles, which consists in assembling on a last an upper and an insole provided with a shoulder in transverse relation to its bottom face at a distance from its edge, working the upper into lasted position in substantial conformity to the angle between the margin of the insole and said shoulder and fastening it in said angle to insure that it will be held in lasted position while the cement is setting, and thereafter removing the shoulder portion of the insole and that portion of the upper which is lasted against it and applying an outsole in contact with the exposed face of that portion of the upper that is lasted over the margin of the insole.

27. That improvement in methods of making shoes in which cement is employed to secure uppers in lasted relation to insoles which consists in assembling on a last an upper and an insole provided with a marginal recess and with a shoulder in transverse relation to its bottom face at the inner edge of said recess, working the upper into lasted position in substantial conformity to the angle between the margin of the insole and the shoulder and stapling the upper in said angle to insure that it will be held in lasted position while the cement is setting, removing that portion of the upper which is lasted against the shoulder and thereby removing the staples, and thereafter applying an outsole in contact with the exposed face of that portion of the upper which is lasted over the margin of the insole.

28. That improvement in methods of making shoes in which cement is employed to secure uppers in lasted relation to insoles which consists in assembling on a last an upper and an insole provided on its bottom face with a marginal recess of substantially the same depth as the thickness of the upper materials, working the upper into lasted position in said recess and fastening it with its margin in upturned relation to the shoe bottom, and thereafter trimming off the upturned margin of the upper substantially flush with the exposed face of that portion of the upper that overlies the margin of the insole.

29. That improvement in methods of making shoes in which cement is employed to secure uppers in lasted relation to insoles, which consists in assembling on a last an upper and an insole having on its bottom face a marginal recess of substantially the same depth perpendicularly to the plane of the insole as the thickness of the upper materials, working the upper into lasted position in said recess and fastening it with its margin in upturned relation to the shoe bottom, and thereafter trimming off the upturned margin of the upper substantially flush with the exposed face of that portion of the upper which overlies the margin of the insole and with that portion of the bottom face of the insole which is located farther inwardly than said recess.

30. That improvement in methods of making shoes in which cement is employed to secure upper materials in lasted relation to insoles, which consists in working upper materials over an insole into lasted position with the inner portion of the margin of the upper materials in upstanding relation to the insole and by the lasting pressure against the overlaid margin of the upper materials working excess cement into the upturned portion of the upper materials, securing the upper materials in lasted position while the cement is setting, and thereafter trimming off the upturned portion of the upper materials together with said excess cement.

31. That improvement in methods of making shoes in which cement is employed to secure uppers in lasted relation to insoles, which consists in assembling an insole having a lip and an upper upon a last, applying cement for securing the upper to the insole, working the upper into lasted position over the margin of the insole with a portion of its margin upturned against the lip and by the lasting pressure working excess cement away from the bottom face of the insole between the upturned margin of the upper and the lip, holding the upper in lasted position while the cement is setting, and thereafter removing the lip and the upturned portion of the upper together with the excess cement.

32. That improvement in methods of making shoes in which cement is employed to secure uppers in lasted relation to insoles, which consists in assembling on a last an upper and an insole provided on its bottom face with a marginal recess of substantially the same depth perpendicularly to the plane of the insole as the thickness of the upper materials and with an upstanding lip at the inner edge of said recess, working the upper over the margin of the insole into lasted position in said recess with a portion of its margin in upturned position against the lip and inserting staples to secure the upper to the lip, and after the cement has set removing that portion of the upper and lip which extends beyond the exposed face of that portion of the upper that overlies the margin of the insole and beyond that portion of the bottom face of the insole which is located farther inwardly than the lip, whereby the staples are removed and an even bottom for the reception of an outsole is provided.

33. That improvement in methods of lasting shoes which comprises providing an insole having a lip thereon and upturning the lip to form an upstanding rib spaced inwardly from the edge of the insole, applying adhesive between the margin of said insole and the lasting allowance of an upper, forcing the adhesive-treated parts into contact, inserting temporary fastening means to hold said rib and lasting allowance together, permitting the adhesive to set, and thereafter removing the surplus lasting allowance, the rib and the temporary fastening means.

34. That improvement in methods of lasting shoes which comprises providing an insole with a rib projecting upwardly from the surface and spaced inwardly from the edge thereof, applying adhesive between the margin of said insole and the lasting allowance of an upper, forcing the adhesive-treated parts into contact, temporarily fastening the lasting allowance to said rib, permitting the adhesive to set, and thereafter cutting off the surplus lasting allowance and the rib substantially flush with the surface of the insole.

35. That improvement in methods of making shoes which comprises, in combination, providing an insole with ribs projecting upwardly from the surface and spaced inwardly from the edges thereof along the shank and forepart portions, applying adhesive between the margin of said insole and the lasting allowance of an upper, pulling over and side lasting said upper by inserting temporary fastening means to hold said ribs and the adjacent lasting allowance together while forcing the adjacent adhesive-treated parts into contact, lasting the heel and toe portions of said shoe, permitting the adhesive to set, and thereafter cutting off the surplus lasting allowance and the ribs substantially flush with the surface of the insole to provide a lasted upper having a substantially flat bottom.

36. That improvement in methods of making shoes which consists in assembling an insole having a lipped forepart and an upper upon a last, applying cement to the marginal portion of the upper materials and insole at the forepart for securing the upper in lasted position to the insole, working the upper over the margin of the insole into lasted position against the lip at the forepart and inserting fastenings through the upper to fasten the upper to the lip, working the upper at the shank over the insole and inserting fastenings through the upper and into the body of the shank portion of the insole and anchoring the fastenings in the substance of the insole without passing completely therethrough so that the inner face of the insole remains intact, trimming off the lip at the forepart and the portion of the upper that is lasted against the lip substantially flush with the exposed face of that portion of the upper that overlies the margin of the insole at the forepart of the shoe and thereby removing the fastenings by which the upper was secured to the lip of the insole but leaving the fastenings at the shank portion of the shoe to hold the upper in lasted position.

37. That improvement in methods of making shoes which consists in assembling an insole having a lipped forepart and an upper upon a last, applying cement to the marginal portion of the upper materials and insole at the forepart for securing the upper in lasted position to the insole, working the upper over the margin of the insole into lasted position against the lip at the forepart and driving staples through the upper to fasten the upper to the lip, working the upper at the shank over the insole and driving staples through the upper and into the body of the shank portion of the insole and anchoring the staples in the substance of the insole without passing completely therethrough so that the inner face of the insole remains intact, trimming off the lip at the forepart and the portion of the upper that is lasted against the lip substantially flush with the exposed face of that portion of the upper that overlies the margin of the insole at the forepart of the shoe and thereby removing the staples by which the upper was secured to the lip of the insole but leaving the staples at the shank portion of the shoe to hold the upper in lasted position.

38. A shoe comprising an insole having its marginal portion reduced in thickness along the shank and forepart of the shoe from breast line to breast line and having a lip extending from breast line to ball line at each side of the shank, an upper having its margin overlying the reduced margin of the insole, the upper at the forepart of the shoe being flush with the surface of the central portion of the insole and having the inner edge portion of the upper at the shank portion secured by metallic fastenings to the lip, and an outsole secured to the portion of the upper which overlies the reduced margin of the insole.

39. A shoe comprising an insole having its marginal portion reduced in thickness along the shank and forepart of the shoe from breast line to breast line and having a lip extending from breast line to ball line at each side of the shank, an upper having its margin overlying the reduced margin of the insole and secured thereto by water-dispersed rubber cement, the upper at the forepart of the shoe being flush with the surface of the central portion of the insole and the upper having its inner edge at the shank portion secured by staples to the lip, and an outsole secured by cement to the portion of the upper which overlies the reduced margin of the insole.

40. A shoe comprising an insole having its marginal portion reduced in thickness along the shank and forepart of the shoe from breast line to breast line and having a lip extending from breast line to ball line at each side of the shoe, an upper having its margin overlying the reduced margin of the insole and secured thereto by cement, the upper at the forepart of the shoe being flush with the surface of the central portion of the insole and the inner edge portion of the upper at the shank portion being secured by staples to the lip, and an outsole secured by pyroxylin cement to the portion of the upper which overlies the reduced margin of the insole.

41. A shoe comprising an insole having its marginal portion reduced in thickness about the forepart from ball line to ball line, an upper having its marginal portion overlying the reduced portion of the insole and secured thereto by cement with its outer surface flush with the surface of the unreduced central portion of the insole, the overlasted marginal portion of the upper at the shank overlying the marginal portions of the shank of the insole and being secured in lasted relation thereto by staples inserted through the upper and into the insole, the legs of the staples being curved in the body of the insole so that they are anchored without penetrating through to the inner face of the insole.

42. A method of lasting a shoe, including, in combination, providing an inner sole with an upstanding rib spaced inwardly from the edge thereof, adhesively securing the lasting allowance of an upper in lasted position to the inner sole outwardly of said rib, holding said lasting allowance in said position until the adhesive is dry by means of temporary fastening means secured to the edge of the lasting allowance and the rib, and thereafter removing the surplus lasting allowance together with said rib and said temporary fastening means.

43. A method of lasting a shoe, including, in combination, providing an inner sole with an upstanding rib spaced inwardly from the edge thereof, applying adhesive between the margin of said inner sole and the lasting allowance of an upper, lasting said upper by temporarily fastening the lasting allowance to said rib while forcing the adhesively treated parts into contact, permitting the adhesive to set, and thereafter removing the surplus lasting allowance together with said rib.

44. A method of lasting a shoe, including, in combination, providing an inner sole with an upstanding rib spaced inwardly from the edge thereof, applying adhesive between the margin of said inner sole and the lasting allowance of an upper, forcing the adhesively treated parts into contact, inserting temporary fastening means between said rib and said lasting allowance, permitting the adhesive to set, and thereafter cutting away the rib and surplus lasting allowance together with said temporary fastening means.

GEORGE GODDU